United States Patent
George et al.

(10) Patent No.: US 8,483,673 B2
(45) Date of Patent: *Jul. 9, 2013

(54) SYSTEM AND METHOD TO DETECT PBX-MOBILITY CALL FAILURE

(75) Inventors: Richard John George, Waterloo (CA); Yuriy Lobzakov, Walnut Creek (CA); Colin Mark Werner, Kitchener (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/620,130

(22) Filed: Sep. 14, 2012

(65) Prior Publication Data
US 2013/0012193 A1 Jan. 10, 2013

Related U.S. Application Data

(63) Continuation of application No. 12/897,074, filed on Oct. 4, 2010.

(51) Int. Cl.
*H04M 3/24* (2006.01)
(52) U.S. Cl.
USPC ......... 455/414.1; 455/424; 455/466; 370/261
(58) Field of Classification Search
USPC ................ 455/555, 445, 417, 553.1, 552.1, 455/433, 413, 414.1, 424, 466; 370/352, 370/328, 338, 401, 261; 379/201.02, 220.01, 379/88.17
See application file for complete search history.

(56) References Cited

U.S. PATENT DOCUMENTS

| | | | |
|---|---|---|---|
| 5,903,833 A * | 5/1999 | Jonsson et al. | 455/417 |
| 6,754,181 B1 | 6/2004 | Elliott et al. | |
| 2002/0124100 A1 * | 9/2002 | Adams | 709/232 |
| 2002/0132638 A1 | 9/2002 | Plahte | |
| 2004/0203593 A1 | 10/2004 | Whelan et al. | |
| 2004/0203637 A1 | 10/2004 | Dodla | |
| 2007/0070976 A1 | 3/2007 | Mussman | |
| 2007/0206571 A1 * | 9/2007 | Silver | 370/352 |
| 2007/0223401 A1 | 9/2007 | Chatterjee | |
| 2007/0253545 A1 * | 11/2007 | Chatterjee et al. | 379/211.02 |
| 2009/0163232 A1 * | 6/2009 | Kondru et al. | 455/466 |
| 2009/0215438 A1 * | 8/2009 | Mittal et al. | 455/418 |

FOREIGN PATENT DOCUMENTS

| | | |
|---|---|---|
| EP | 1534025 A2 | 5/2005 |
| EP | 2088739 A1 | 8/2009 |
| WO | 0046938 A1 | 8/2000 |

OTHER PUBLICATIONS

Extended European Search Report mailed Mar. 11, 2011, in corresponding European patent application No. 10186429.6.

\* cited by examiner

*Primary Examiner* — Mahendra Patel
(74) *Attorney, Agent, or Firm* — Novak Druce Connolly Bove + Quigg LLP

(57) ABSTRACT

Aspects relate to initiating voice calls to mobile devices from an enterprise network. In one example, a server can initiate a voice channel to a mobile device, and if the mobile device cannot be reached, an access network may redirect the call from the server to a number identified as a voicemail number; however, such number is reconfigured to instead be directed to a number located within the enterprise network. The server can monitor or receive an indication that a call is incoming, and attributable to the mobile device. If such a call is incoming or received, then the server determines that the call has failed. If the mobile device answers the call, the server can determine that the voice channel has been established, without waiting for a confirmation indication, such as a DTMF tone.

7 Claims, 5 Drawing Sheets

US 8,483,673 B2

SYSTEM AND METHOD TO DETECT PBX-MOBILITY CALL FAILURE

CROSS-REFERENCE TO RELATED APPLICATION

This application is a continuation of U.S. application Ser. No. 12/897,074, entitled System and Method to Detect PBX-Mobility Call Failure, which was filed on Oct. 4, 2010 and which is fully incorporated by reference herein.

BACKGROUND

1. Field

The present application relates to mobile device communications, such as voice and data communication, and more particularly to calls involving a PBX.

2. Related Art

Mobile devices are used for voice and data communications. Increasingly, mobile devices can be used in a business environment, and it can be desirable to involve telephony systems typically associated with business environments, such as Private Branch Exchanges (PBXs) in mobile telephony. Further advancements in these areas remains desirable.

BRIEF DESCRIPTION OF THE DRAWINGS

Reference will now be made, by way of example, to the accompanying drawings which show example embodiments of the present application, and in which.

DESCRIPTION

Figure 1:
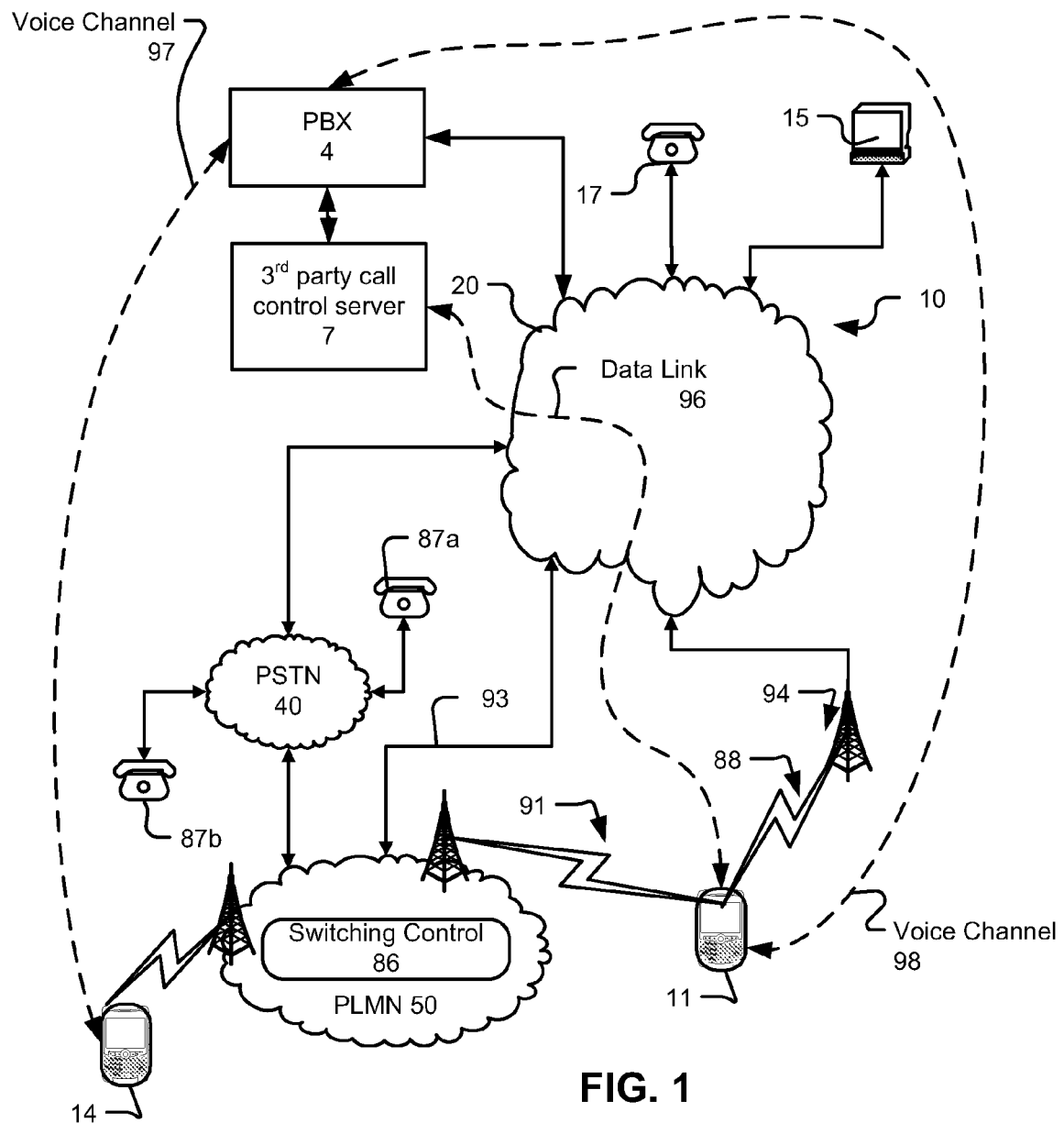
FIG. 1 depicts a diagram of a network involving a PBX, a call control server, and a mobile device, among other elements depicted to provide context.

Mobile devices are increasingly used for communication, such as voice calling and data exchange. Also, mobile devices increasingly can use a wider variety of networks for such communication. For example, a mobile device can have a broadband cellular radio and a local area wireless network radio. Additionally, the broadband cellular capability of a mobile device may itself support a variety of standards, or protocols that have different communication capabilities, such as GSM, GPRS, EDGE and LTE.

Extending capabilities provided by Private Branch eXchanges (PBX) to land line telephones in the confines of a location, such as a building, to mobile devices presents challenges. One continued theme is to improve a user experience, such that a user on a mobile device has an experience similar to one that he may have when on a land line telephone. There may be a variety of circumstances in which a PBX may initiate a call to a mobile phone. One circumstance is when a user has configured the PBX to call the user's mobile device if the user does not answer a land line telephone. In another example, a user can indicate from his mobile device that a PBX anchored call is to be initiated. A variety of other circumstances and usage scenarios may also require the PBX to call the mobile device.

However, a mobile device is not "always" available. For example, the mobile device may be off or out of range of a suitable wireless network. Wireless networks have infrastructure that maintain a registry of which mobile devices are available and when (e.g., a Home Location Registry (HLR) in a GSM-based network). Therefore, when a call comes to the wireless network operator for a given mobile device, the infrastructure determines whether that mobile device is available or not. If the mobile device is not available, the wireless network infrastructure redirects the call from the mobile device to a voice mail number (e.g., the infrastructure equipment can determine whether the HLR indicates the mobile device is unavailable).

However, for the purposes that a PBX would call the mobile device, it would be of little use to be connected to voicemail. To account for these circumstances, a PBX calling a mobile device may wait for confirmation from the called mobile device that the mobile device has answered, and that the call was not redirected to voicemail. One way that confirmation of answering may occur is that the mobile device may send a tone or tones to the PBX over the voice channel, once it is established. However, sending these tones through the network incurs a delay, which can be on the order of 2 seconds. Thus, when a person "answers" the incoming call at the mobile device on the interface of the device, the person would naturally expect to be able to begin talking. However, due to the delay in the PBX confirming that the call was answered, the user may have to wait some time before actually being able to begin the call. It would be desirable to avoid this delay.

In one aspect, an approach to avoiding this delay is to reprogram the voicemail number to which calls are forwarded (by the network) when the mobile device is unavailable. Instead of the voice mail number, the number is a number that can be monitored by a device in communication with the PBX (or the PBX itself). For example, a Direct Inward Dial (DID) number on the PBX can be programmed into the phone instead of the voice mail number. The number programmed into the phone is used to configure the network appropriately. As explained herein, when the PBX calls the mobile device, the PBX can also monitor the DID for a call that originates from the mobile device.

If a call comes into the DID at an appropriate time (can be further qualified by a calling party identifier check), then the PBX can infer that the call to the mobile device was redirected, and the mobile device will not answer. However, if there is no call to the DID, then the PBX can instead infer that the call was answered, and can directly proceed to connect the voice channel, and not wait for a further confirmation from the mobile device. The following disclosure provides examples and explains other aspects that can be implemented.

Reference is now made to FIG. 1, which shows, in block diagram form, an example system arrangement 10, for explaining aspects according to this disclosure in more detail. FIG. 1 depicts that arrangement 10 includes a network 20, which can be comprised of one or more internets and other networks, and can include, for example, a corporate intranet, as well as components of public networks, such as components of the Internet. FIG. 1 depicts that communication devices, such as a telephone 17 and a computer 15 can be coupled to communicate using network 20. PSTN 40 also is depicted as being in communication with network 20. Two PSTN telephones 87a and 87b are depicted as being reachable over the PSTN. A Public Land Mobile Network (PLMN) 50 also is depicted, and includes a switching control 86. PLMN 50 is coupled to PSTN 40, and to network 20, through a data communication path 93. Data communication path 93 can include one or more packet networks, or linkages between packet networks. Separate identification of network 20 and path 93 is at least partially a matter of convenience, in that path 93 also, in many circumstances, could be considered part of network 20. One operative distinction being that PSTN 40 operates over circuit-switched lines, while communication path 93, and network 20 can include a wide variety of digital communication technologies, including packet switching technologies and protocols. For example, Internet Protocol (IP) addressing, and Session Initiation Protocol (SIP) can be used for establishing and conducting voice communications carried over path 93 and network 20.

A mobile device 11 is depicted as communicating with PLMN 50 using cellular communication 91. Cellular communication 91 can itself be implemented using a wide variety of technologies, and can also include voice and data network components (e.g., a voice channel and a data channel time, frequency, or code division multiplexed, according to any of a variety of implemented or proposed cellular communication approaches). Mobile device 11 also can communicate using wireless Local Area Network (LAN) technologies 88, such as those according to the IEEE 802.11 series of standards and proposals. Communication using such WLAN technologies 88 can occur between mobile device 11 and a base station 94, which in turn is coupled with network 20.

FIG. 1 also depicts that a voice channel 98 can be established between mobile device 11 and a Private Branch Exchange (PBX) 4, and a voice channel 97 between another device (e.g., a mobile device 14) and PBX 4. In one example, mobile device 14 is attempting to call mobile device 11, and the PBX 4 may establish voice channel 98 in order to complete the call. In other examples, mobile device 11 can request that PBX 4 establish a voice channel to it, and to another entity, such as mobile device 14, or landline phones 87a or 87b.

A data channel 96 can be provided between third party call control server 7 and mobile device 11. Information can be signaled across data channel 96 for exchanging setup and progress information for voice calls that can be carried over a variety of media, such as portions of the PSTN, PLMN 50, and portions of network 20. For example, mobile device 11 can signal to third party call control server 7 to call mobile device 11, to establish a voice channel.

Figure 2:
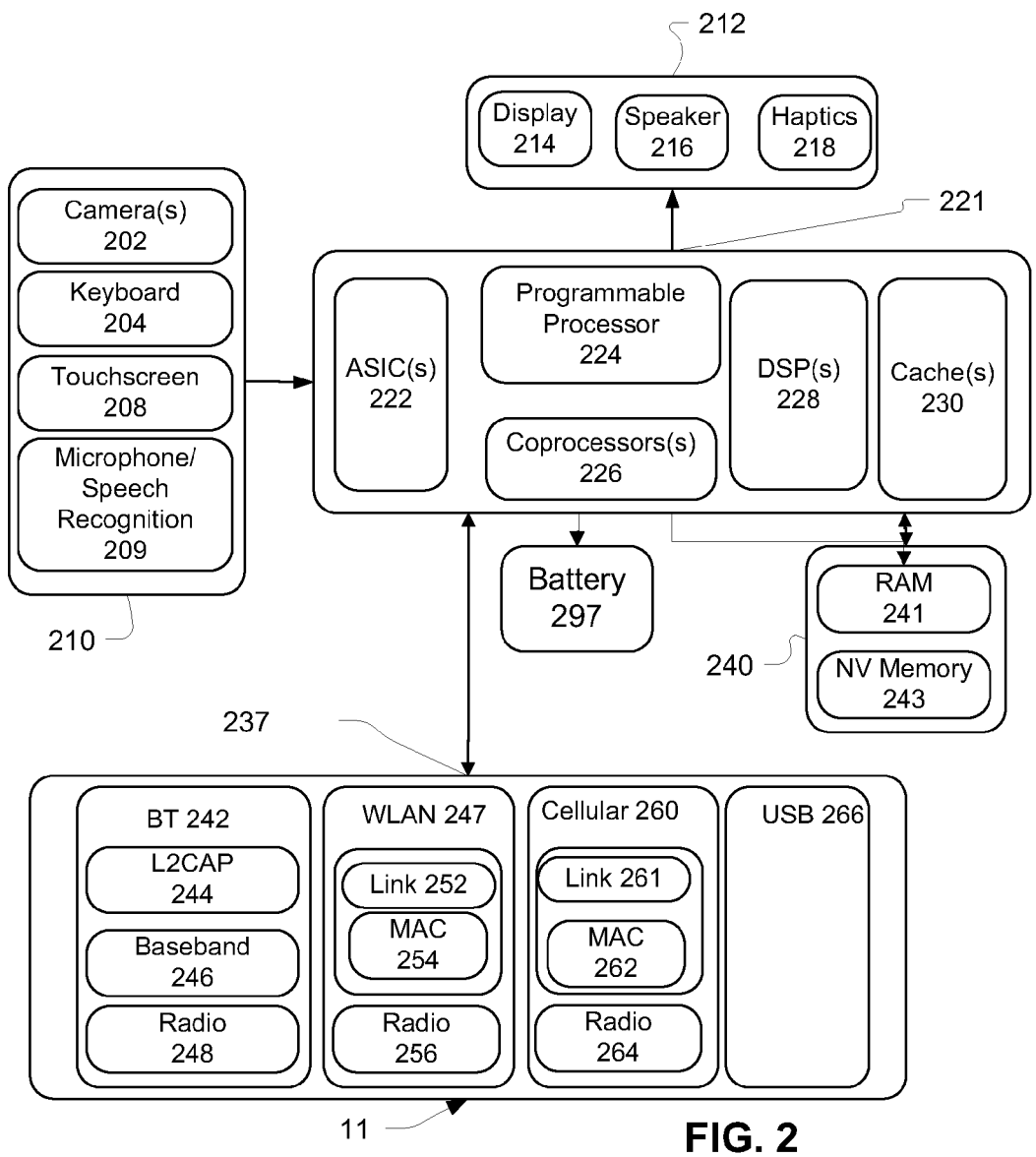
FIG. 2 depicts example of components of an example mobile device.

FIG. 2 depicts example components that can be used in implementing mobile device 11 according to the above description. FIG. 2 depicts that a processing module 221 may be composed of a plurality of different processing elements, including one or more ASICs 222, a programmable processor 224, one or more co-processors 226, which each can be fixed function, reconfigurable or programmable, and one or more digital signal processors 228. For example, an ASIC or co-processor 222 may be provided for implementing graphics functionality, encryption and decryption, audio filtering, and other such functions that often involve many repetitive, math-intensive steps. Processing module 221 can comprise memory to be used during processing, such as one or more cache memories 230.

Processing module 221 communicates with mass storage 240, which can be composed of a Random Access Memory 241 and of non-volatile memory 243. Non-volatile memory 243 can be implemented with one or more of Flash memory, PROM, EPROM, and so on. Non-volatile memory 243 can be implemented as flash memory, ferromagnetic, phase-change memory, and other non-volatile memory technologies. Non-volatile memory 243 also can store programs, device state, various user information, one or more operating systems, device configuration data, and other data that may need to be accessed persistently. A battery 297 can power device 11 occasionally, or in some cases, it can be a sole source of power. Battery 297 may be rechargeable.

User input interface 210 can comprise a plurality of different sources of user input, such as a camera 202, a keyboard 204, a touchscreen 208, and a microphone, which can provide input to speech recognition functionality 209. Output mechanisms 212 can include a display 214, a speaker 216 and haptics 218, for example. These output mechanisms 212 can be used to provide a variety of outputs that can be sensed by a human, in response to information provided from processing module 221.

Processing module 221 also can use a variety of network communication protocols, grouped for description purposes here into a communication module 237, which can include a Bluetooth communication stack 242, which comprises a L2CAP layer 244, a baseband 246 and a radio 248. Communications module 237 also can comprise a Wireless Local Area Network (247) interface, which comprises a link layer 252 with a MAC 254, and a radio 256. Communications module 237 also can comprise a cellular broadband data network interface 260, which in turn comprises a link layer 261, with a MAC 262. Cellular interface 260 also can comprise a radio 264 for an appropriate frequency spectrum. Communications module 237 also can comprise a USB interface 266, to provide wired data communication capability. Other wireless and wired communication technologies also can be provided, and this description is exemplary.

Figure 3:
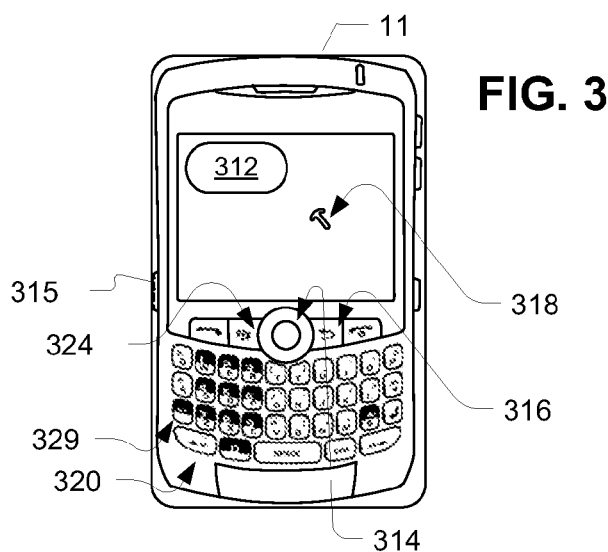
FIG. 3 depicts an example view of an example mobile device, and some of the user interface componentry thereof.

Referring to FIG. 3, there is depicted an example of mobile device 11. Mobile device 11 comprises a display 312 and a cursor or view positioning device, here depicted as a trackball 314, which may serve as another input member and is both rotational to provide selection inputs and can also be pressed in a direction generally toward housing to provide another selection input. Trackball 314 permits multi-directional positioning of a selection cursor 318, such that the selection cursor 318 can be moved in an upward direction, in a downward direction and, if desired and/or permitted, in any diagonal direction. The trackball 314 is, in this example, situated on a front face (not separately numbered) of a housing 320, to enable a user to maneuver the trackball 314 while holding mobile device 11 in one hand. In other embodiments, a trackpad or other navigational control device can be implemented as well.

The mobile device 11 in FIG. 3 also comprises a programmable convenience button 315 to activate a selected application such as, for example, a calendar or calculator. Further, mobile device 11 can include an escape or cancel button 316, a menu or option button 324 and a keyboard 329. Menu or option button 324 loads a menu or list of options on display 312 when pressed. In this example, the escape or cancel button 316, menu option button 324, and keyboard 329 are disposed on the front face of the mobile device housing, while the convenience button 315 is disposed at the side of the housing. This button placement enables a user to operate these buttons while holding mobile device 11 in one hand. The keyboard 329 is, in this example, a standard QWERTY keyboard.

Figure 4:
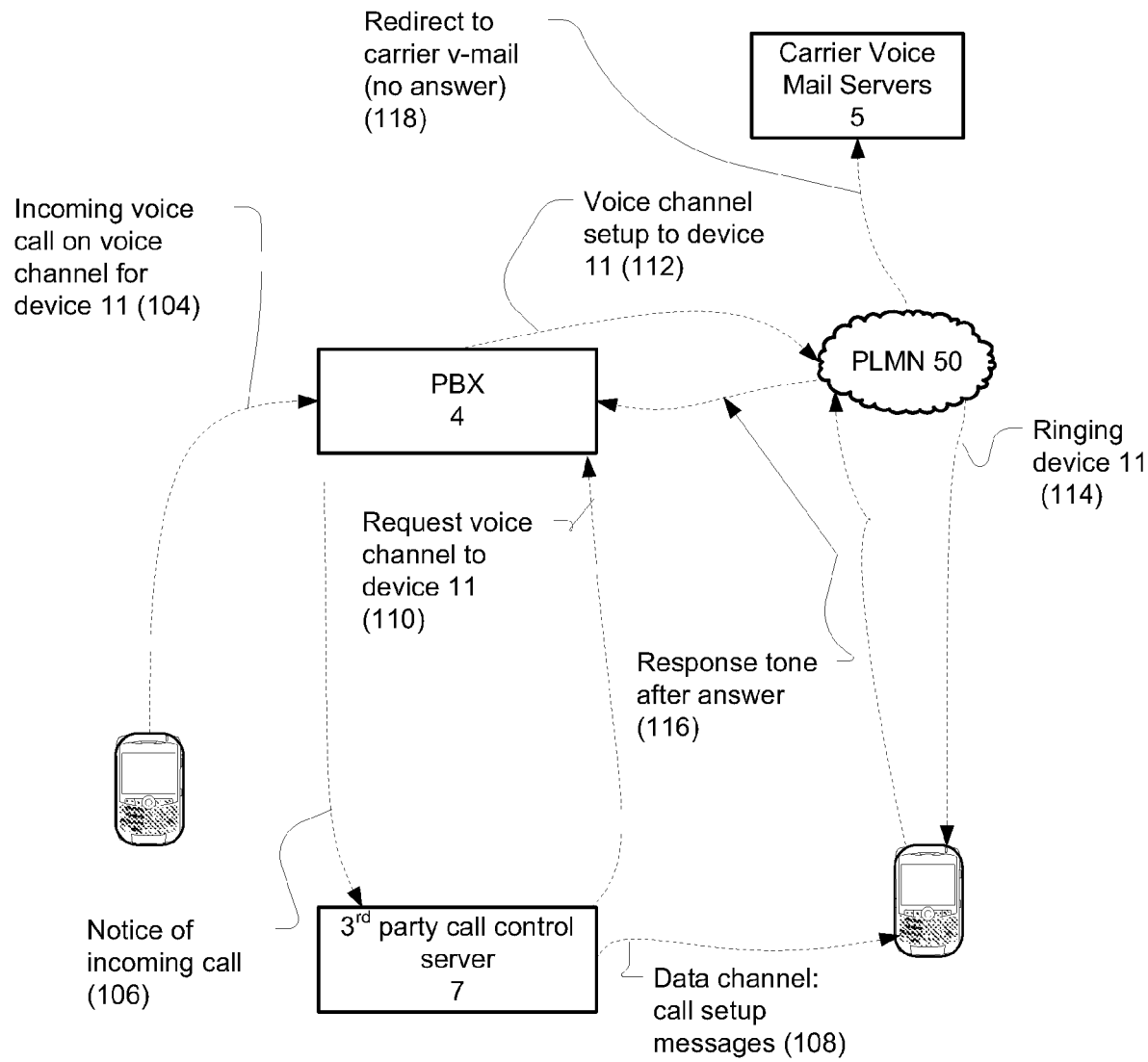
FIG. 4 depicts a prior approach to establishing a voice channel from a PBX (or more generally, an entity within a network, such as an enterprise network), to a mobile device.

FIG. 4 depicts a situation in which a third-party call control server uses PBX 4 to initiate a voice channel to a mobile device 11 over PLMN 50. FIG. 4 depicts for example that an incoming voice call (104) on a voice channel can be received at PBX 4 for mobile device 11. PBX 4 can send a notice (106) of the incoming call to third-party call control server 7. Third-party call control server (3PCC) 7 can begin to initiate (110) a voice channel to device 11, using PBX 4. Here, 3PCC 7 can be viewed as controlling PBX 4, so that PBX 4 initiates a voice channel through PLMN 50 to device 11. PLMN 50 attempts to locate device 11, and indicate to device 11 that it should begin ringing. If PLMN 50 can not locate device 11, for example, because device 11 is not presently in a serviceable area PLMN 50 can cause the call to be redirected (118) to a voicemail server 5.

However, if device 11 can receive the call, device 11 can answer and modulates (116) one or more tones (such as DTMF tones) over the voice channel. PBX 4, upon receiving those one or more tones, can responsively determine that the call has been completed. In the absence of such tones, PBX 4 typically would be unable to distinguish between the mobile device 11 answering the call, which would successfully establish the voice channel, and voicemail server 5 answering the call, which would indicate a failure mode.

In call scenarios, such as that of FIG. 4, device 11 can be programmed to automatically answer incoming calls from PBX 4, and a user does not need to explicitly accept such a call through an interface.

Figure 5:
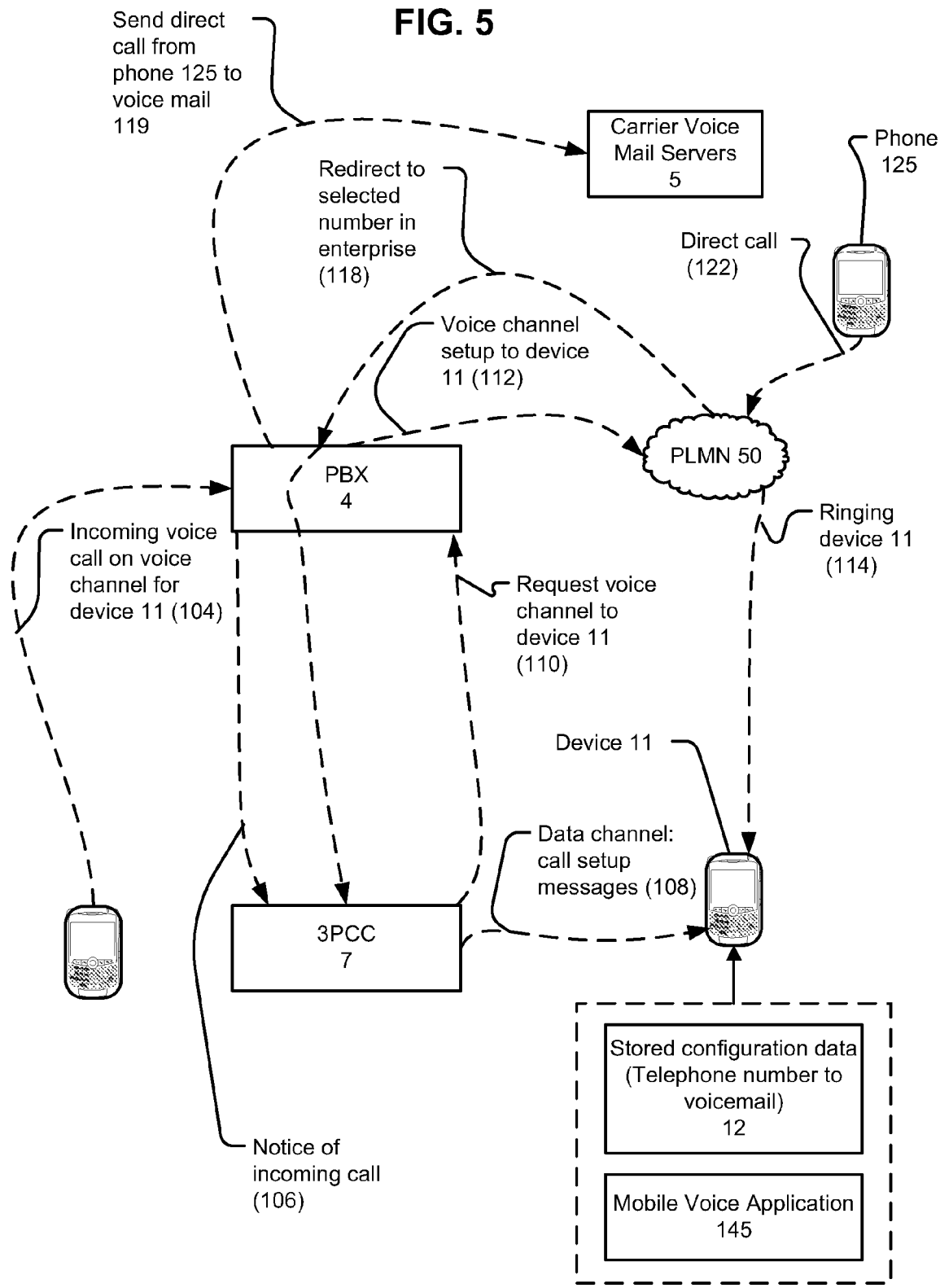
FIG. 5 depicts an approach to establishing such a voice channel, where a voicemail number associated with the mobile device is instead used to refer to a number associated with the network, such a failure condition, evidenced by a need to redirect to voicemail, can instead be used to directly signal the enterprise network of the failure condition.

FIG. 5 depicts a similar system organization in which a different approach is taken to validating whether mobile device 11 has answered a call in such a situation, rather than a voicemail server, such as voicemail server 5. FIG. 5 depicts a scenario where an incoming call (104) is received at PBX 4 destined for device 11, for which PBX 4 notifies (106) third-party call control server 7. PBX 4 begins to initiate (112) a voice channel to device 11, which would involve PLMN 50. PLMN 50 attempts to ring (114) device 11. However, as with FIG. 4, device 11 may not be capable of receiving a call at that time. If device 11 cannot receive a call, PLMN 50 would redirect (118) the call to a telephone number associated with a voicemail configuration setting, which typically would be intended to identify a voicemail server such as voicemail server 5 (such telephone number/configuration information is depicted as being stored in stored configuration data 12 that can be stored in non-volatile memory 243). In the example of FIG. 5, however, the number programmed into such a configuration setting refers back to a number within an enterprise network, which can include PBX 4 and third-party call control server 7.

Third-party call control server is notified by PBX 4 of the incoming call. Information obtained from the incoming call can be used to identify that the call is a voicemail redirect or otherwise can be attributed to device 11. Third-party call control server 7 can be programmed to correlate the voice channel set up in progress to device 11 with the incoming call from device 11 to the predetermined number in the enterprise network. Such correlation can include a timing-based correlation, and can also be based on information such as call diversion information, as available. Such correlation also can be aided by providing a specific dial-in number for each mobile device. In another implementation, a network operator can participate in the forwarding by providing a further identifier that distinguishes among mobile devices that may call a given dial-in number for the purposes disclosed herein.

Third-party call control server 7 is programmed to determine that the voice channel to mobile device 11 failed under such a circumstance. Conversely, if the voice call is answered in any fashion, while the voice channel is being set up, that situation is indicative of voice channel setup success, because the call only can be answered by device 11 and not by a voicemail server such as voicemail server 5, because the number that was pointing to voicemail now points to a DID of PBX 4. Although such correlation is attributed to 3PCC 7 in this disclosure, it can be implemented in any of a variety of devices, including PBX 4.

Thus, in the implementation of FIG. 5, no DTMF acknowledgment tone need be sent by device 11 to indicate that it has answered the call. Call setup time therefore can be reduced because the delays introduced by transmitting, receiving, and processing such DTMF tones are avoided.

Implementations according to these examples can vary based on the technology being employed. For example, in newer GSM phones, a redirect telephone number can be programmed into the telephone, and this setting is propagated to the network. For CDMA-based devices, and older GSM devices, specific telephone prefixes may be assigned to represent different forwarding conditions. In other situations, a user may be provided a web interface in which such settings can be managed. In other situations, an administrator may handle setup of these parameters by working with a network operator. In any case, there would be one or more ways available for causing the forwarding phone number to be one that can be monitored by a device in communication with the PBX (or the PBX itself).

A variety of other conditions and situations can be accounted for in some implementations. One situation is where a number of devices are to be configured to operate according to this approach, leading to the issue of how to attribute incoming calls to mobile device, where those incoming calls arrive on a single DID, if a single DID is used. One approach is to use call diversion information, to differentiate among the mobile devices, if such information is available. Call diversion information indicates which telephone number a given call was originally directed to, while calling party identification information identifies the identity of an originator of the call. Another approach can be to assign each mobile device to its own DID, such that a call coming in to that DID is attributable only to that phone. In one implementation, the DID assigned to that device can be a DID assigned to a land line associated with the mobile device (e.g., a person has a land line number assigned to a desk phone, and a mobile number assigned through a network operator to a mobile phone, and the mobile phone can be programmed to cause redirection of unanswered calls to the desk phone number).

Another situation that can be accounted for is that a call directly to a mobile device (e.g., from a device, such as phone 125 in FIG. 5) also will be redirected to PBX 4, if device 11 does not answer. If PBX 4 receives such a call, then PBX 4 should forward that call to voicemail server 5. PBX 4 can determine whether a call should be forwarded based on calling party information. If the calling party information indicates an origin other than PBX 4 (or another number known to the PBX, from which such calls would originate), then PBX 4 can forward the call to voicemail servers 5. FIG. 5 also depicts that the functions and configuration attributed to mobile device 11 can be conducted by a mobile voice application 145 installed on mobile device 11. Mobile voice application 145 can periodically check that the appropriate configuration settings remain in place, as disclosed with respect to FIG. 7, below.

Figure 6:
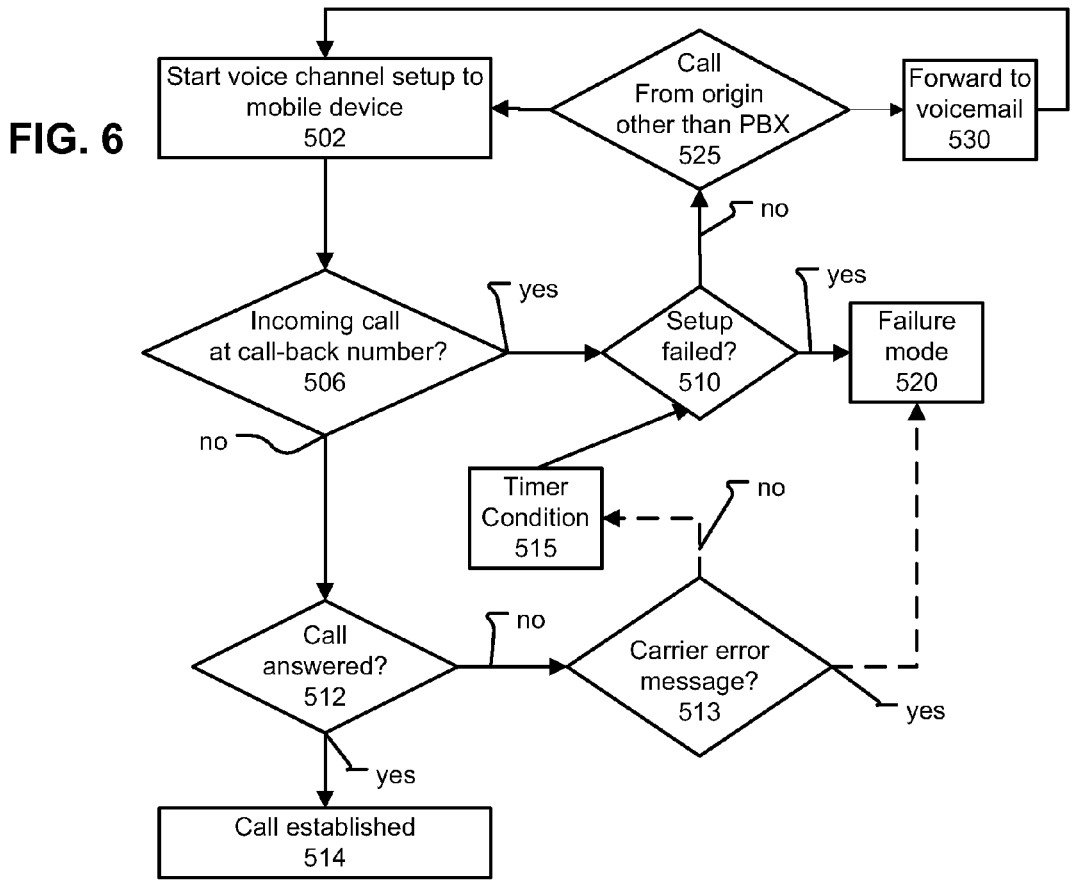
FIG. 6 depicts an example method that can be implemented by an enterprise network according to the example of FIG. 5.

FIG. 6 depicts an example method, which can be carried out within an enterprise network to implement the call setup according to this disclosure. The method includes starting (502) to set up a voice channel to mobile device 11. As the voice channel is being set up, waiting to determine (506) whether an incoming call has been received at a known callback number is initiated. If no incoming call is detected, then a determination (512) whether or not the call has been answered is conducted. If the call was answered then, they can be determined that the call has been established (514). However, if the call is not answered, and there has been no error message (513), then waiting continues to receive the incoming call (506) or to have the call answered (512) or to receive a carrier error message (513). If a carrier error message is received, then it is determined that the call failed and a failure mode can be entered (520), which can include returning (502) to attempt setup of the voice channel again.

If there is an incoming call at the call back number (506), then a setup failure analysis can be conducted (510). One mode of failure may be that the call coming in to the DID number originates from a source other than a redirection of the call from device 11 (e.g., a separate call from device 125). In such a circumstance (determination 125), that call should be redirected (530) to voicemail 5, and setup (502) can be retried. In such circumstances, the call can be retried, in some implementations. For example, a third party can attempt to call device 11 directly, and if the third party call does not connect, then the network would forward the call to voice mail. However, this forwarded call is not caused by failure of the call from PBX 4 to connect to device 11, rather, this forwarded call is unrelated to the approach disclosed with respect to FIG. 5. Further, this call ultimately should be redirected to voice mail, so that the third party can leave a message if desired.

As such, in this scenario, a determination of call failure can be made, and it also can be determined that the incoming call to PBX 4 (see FIG. 5-112) was caused by a source other than PBX 4 (or more generally, the enterprise system), then the incoming call is further redirected to carrier voicemail (530) (which would be the default action, if not changed according to an implementation of these disclosures).

Note that here, the call from PBX 4 can be considered a failure if a third party has concurrently attempted to make a call to device 11, and failed to connect (as evidence by the redirect to PBX 4). However, in another example, the method can return to (506), and wait for an incoming call to PBX 4, which is a redirection caused by ringing (114-FIG. 5) device 11. The timing condition (515) can run concurrently with the other aspects depicted in FIG. 6, and expiry of such timer can cause a determination of call failure. Timer status also can be used in deciding/inferring a source of an incoming call. For example, if data is not available as to a source of the redirection, then timer information also can be used to determine whether a timing of the incoming call is potentially too long or too short of a delay to be attributable to redirection of the call from PBX 4. Thus, timer condition 515 can provide input into deciding whether setup failed (510). Because setup can have failed for a variety of reasons, one of which being a concurrent call from a third party, a decision to send a third party to voice mail is depicted as a separate decision that the incoming call is either from PBX 4 or not. However, if that information was used in determining that the call failed (510), then the call incoming to PBX 4 can be transferred to voicemail directly, without a separate decision as to the calls origin.

In response to call failure, legs of the voice channel that have been established can be torn down (or allowed to time out). Set up of the call (502) can be retried.

Figure 7:
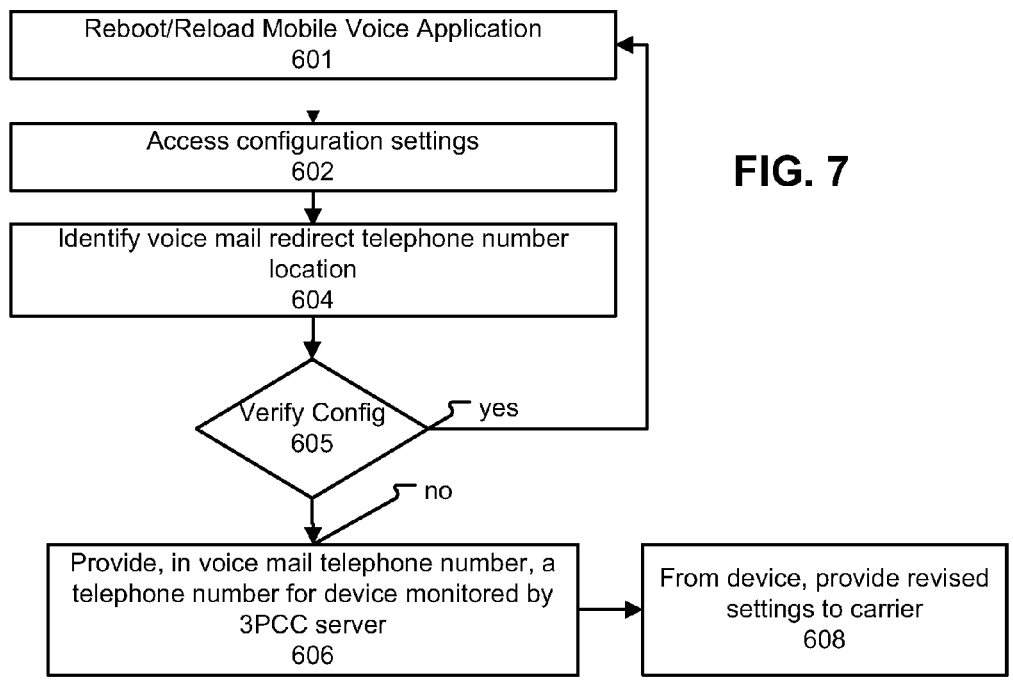
FIG. 7 depicts an example method of setting up a mobile device to function according to the disclosure of FIGS. 5 and 6.

FIG. 7 depicts an example method for configuring a mobile device, such as mobile device 11 to participate in implementations according to this disclosure. The depicted method can be implemented when device 11 is booted, or rebooted, or configured, or when a mobile voice application is running or started (601), such that the method generally runs to verify appropriate configuration to allow implementation of these disclosures. Such rebooting/reloading is depicted to show that an event can occur which triggers the remainder of the steps depicted, but the steps can be performed without a specific triggering event, as well.

The example depicted in FIG. 7 includes accessing (602) configuration settings for mobile device 11, and in particular configuration settings relating to a voicemail set up. Typically, such configuration settings include a telephone number of a voicemail server, such that, the depicted method includes identifying such phone number (604). Rather than a voicemail number, a different number that points back to PBX 4 or third-party call control server 7 is provided (606), such that third-party call control server 7 can monitor that number for an incoming call from mobile device 11, when PBX 4 is attempting to establish a voice channel to mobile device 11.

Configuration verification (605) can include sending a current setting of device 11 over a data channel (e.g., 96) to be verified, or other checking as appropriate, in order to verify such configuration. If the configuration is correct, then no action need be taken, and at some future point, the method can repeat. If the configuration is not correct, then the provision of the number can be effected (606) on device 11, and then the device 11 can update those settings to the carrier network according to the carrier's update schedule, or responsive to a change in such settings.

The method depicted in FIG. 7 can be conducted automatically by a configuration script, by remote access to mobile device 11, or by a user following instructions, for example. Once the information is updated on device 11, that information can be provided from device 11 to the network operator equipment, which will be performing the redirection of calls to that number, if device 11 is unreachable. FIG. 7 depicts an example of how configuration can be done, but configuration settings may vary widely among different kinds of devices, and different kinds of networks, and those of ordinary skill would be able to adapt these disclosures to a particular device and network of interest.

In the foregoing, separate boxes or illustrated separation of functional elements of illustrated systems does not necessarily require physical separation of such functions, as communications between such elements can occur by way of messaging, function calls, shared memory space, and so on, without any such physical separation. As such, functions need not be implemented in physically or logically separated platforms, although they are illustrated separately for ease of explanation herein.

For example, different embodiments of devices can provide some functions in an operating system installation that are provided at an application layer or in a middle layer in other devices. Different devices can have different designs, such that while some devices implement some functions in fixed function hardware, other devices can implement such functions in a programmable processor with code obtained from a computer readable medium.

Further, some aspects may be disclosed with respect to only certain examples. However, such disclosures are not to be implied as requiring that such aspects be used only in embodiments according to such examples.

The above description occasionally describes relative timing of events, signals, actions, and the like as occurring "when" another event, signal, action, or the like happens. Such description is not to be construed as requiring a concurrency or any absolute timing, unless otherwise indicated.

Certain adaptations and modifications of the described embodiments can be made. Aspects that can be applied to various embodiments may have been described with respect to only a portion of those embodiments, for sake of clarity. However, it is to be understood that these aspects can be provided in or applied to other embodiments as well. Therefore, the above discussed embodiments are considered to be illustrative and not restrictive.

The invention claimed is:

1. A method of controlling calls from an enterprise network to a communication device on a wireless provider network, comprising:

configuring a wireless provider network to redirect a failed voice call to a call-back telephone number that is associated with an enterprise network rather than the voicemail number associated with the communication device;

determining if the communication device fails to answer an incoming voice call and routing, if the determination is that the communication device fails to answer the incoming voice call, the voice call to the call-back telephone number associated with the enterprise network;

establishing a voice call to the communication device without receiving a DTMF acknowledgment tone from the communication device to indicate that the communication device has answered the voice call; and redirecting the voice call to voicemail of the communication device in the event that identification information of the calling party is not attributable to the enterprise network, wherein the call-back telephone number is a direct inward dial telephone number of a private branch exchange; and the call-back telephone number is provided based on a land line telephone associated with a user of the communication device.

2. A system for managing network calls to a communication device, the system comprising:

a third party call control server, programmed to:
start establishing a voice channel, over a voice carrier network;
detect an incoming call at a call-back number;
determine whether a source of the incoming call is correlated with a communication device to which the voice channel is being established, and responsively determine that the establishment of the voice channel has failed;

a communication device, with a carrier-provided voicemail capability available at a telephone number determined by the carrier, the communication device programmed to:
substitute the call-back number for the telephone number determined by the carrier, so that the voice carrier network forwards an incoming call for the communication device to the call-back number, if the communication device cannot be reached when the call is incoming, such that no DTMF acknowledgment tone need be sent by the communication device to indicate that it has answered the call; and in the event that identification information of the calling party is not attributable to the network, then redirecting the call to voice mail, wherein the call-back number is a direct inward dial telephone number of a private branch exchange; and the call-back number is provided based on a land line telephone associated with a user of the communication device.

3. The system of claim 2, wherein the third party call control server is further programmed to determine in the event that the incoming call is attributable to a device calling the communication device directly, and responsively redirect the incoming call to voicemail.

4. The system of claim 2, wherein the third party call control server is in communication with a private branch exchange that establishes the voice channel and provides direct inward dial numbers at which incoming calls can be received.

5. The system of claim 2, wherein one of the direct inward dial numbers corresponds to a desk-phone, coupled to the private branch exchange, of a user of the communication device.

6. A communication device, comprising:
a processor;
one or more wireless interfaces for sending and receiving information over one or more wireless networks, and coupled to the processor; and
a memory coupled to the processor, and storing instructions for an enterprise mobile voice application configured to interoperate with a Private Branch eXchange (PBX), and cause a call forward setting of the communication device to be configured to indicate that unanswered calls are to be redirected to a direct inward dial (DID) call-back telephone number at the PBX, and which is assigned to the communication device, such that no DTMF acknowledgment tone need be sent by the communication device to indicate that it has answered a call, wherein in the event that a call has been received at the PBX and is attributable to the communication device, then determining whether calling party identification information is attributable to the PBX associated with the enterprise network system, and if not, then redirecting the call to a voice mail server;

the call-back telephone number is a direct inward dial telephone number of the private branch exchange; and the call-back telephone number is provided based on a land line telephone associated with a user of the communication device.

7. The communication device of claim 6, wherein the enterprise mobile voice application is configured to periodically verify that the call forward setting is configured with the DID telephone number.

* * * * *